US012444159B2

(12) United States Patent
Huang et al.

(10) Patent No.: US 12,444,159 B2
(45) Date of Patent: Oct. 14, 2025

(54) COMMODITY IMAGE INFORMATION ACQUISITION SYSTEM, METHOD AND APPARATUS

(71) Applicant: SHANGHAI HANSHI INFORMATION TECHNOLOGY CO., LTD., Shanghai (CN)

(72) Inventors: Sheng Huang, Shanghai (CN); Yitang Zhuang, Shanghai (CN); Xiaoping Jin, Shanghai (CN)

(73) Assignee: SHANGHAI HANSHI INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/785,841

(22) Filed: Jul. 26, 2024

(65) Prior Publication Data

US 2025/0200929 A1 Jun. 19, 2025

(30) Foreign Application Priority Data

Dec. 18, 2023 (CN) .......................... 202311747373.0

(51) Int. Cl.
*G06V 10/26* (2022.01)
*G06V 10/24* (2022.01)

(52) U.S. Cl.
CPC ............ *G06V 10/26* (2022.01); *G06V 10/245* (2022.01)

(58) Field of Classification Search
CPC ............ G06Q 30/0639; G06Q 10/087; G06Q 30/0207; G06Q 30/06; G06Q 10/10;
(Continued)

(56) References Cited

U.S. PATENT DOCUMENTS

2009/0094140 A1 4/2009 Kwan
2009/0295592 A1* 12/2009 Mizukawa ............. G07G 1/145
340/691.5
(Continued)

FOREIGN PATENT DOCUMENTS

CN 111274845 A 6/2020
CN 107784332 B * 8/2020
(Continued)

OTHER PUBLICATIONS

Japanese Patent Office, "First Office Action," issued in connection with Japanese Patent Application No. 2024-101683, dated Sep. 10, 2024, 7 pages. [English translation provided].

(Continued)

*Primary Examiner* — Ross Varndell
(74) *Attorney, Agent, or Firm* — Hanley, Flight & Zimmerman, LLC (57) ABSTRACT

The disclosure discloses a commodity image information acquisition system, method and apparatus. The system comprises: AIoT management server configured to transmit a product information list to a shelf label management server, and to transmit a notification of starting to take photos to an AI vision system; the shelf label management server configured to determine the electronic shelf label to be notified, and to transmit an information display notification; when the electronic shelf label to be notified performs an information display action, to generate matching relationship between the information display action and the barcode of the commodity and transmit the matching relationship to the AI vision system; the AI vision system configured to shoot the information display action and obtain the shot content; and to perform parse and obtain a recognition result; the commodity information management system configured to associate the electronic shelf label with the commodity.

10 Claims, 3 Drawing Sheets (58) Field of Classification Search
CPC .... G06Q 50/10; G06Q 20/203; G06Q 20/201; G06Q 20/208; G06Q 10/06316; G06Q 30/0282; G06Q 10/063114; G06Q 10/0637; G06Q 30/0201; G06Q 30/02; G06Q 20/386; G06Q 20/12; G09F 3/208; G09F 9/37; G06V 20/20; G06V 20/10; G06V 20/52; G06V 20/70; G06V 10/14; G06V 10/145; G06V 10/764; G06V 10/60; G06V 10/774; B65G 1/137; G16Y 40/10; G16Y 40/30; G07C 9/22; G07C 9/27; G07C 1/20; G06T 7/0008; G06T 7/70; G06F 18/2411; G06F 18/214; G06F 3/147; G06F 3/143
See application file for complete search history.

(56) References Cited

U.S. PATENT DOCUMENTS

| | | | | |
|---|---|---|---|---|
| 2013/0218721 | A1* | 8/2013 | Borhan | G06Q 30/02 705/26.41 |
| 2015/0199942 | A1* | 7/2015 | Mochizuki | G06F 3/147 345/1.3 |
| 2017/0103515 | A1 | 4/2017 | Hulth | |
| 2017/0286901 | A1 | 10/2017 | Skaff et al. | |
| 2020/0234227 | A1 | 7/2020 | Gadou et al. | |
| 2020/0234394 | A1 | 7/2020 | Calhoon et al. | |
| 2020/0279113 | A1 | 9/2020 | Yanagi et al. | |
| 2020/0311659 | A1 | 10/2020 | Yonezawa et al. | |
| 2020/0334620 | A1 | 10/2020 | Yanagi et al. | |
| 2021/0192433 | A1* | 6/2021 | Ji | G06Q 10/06316 |
| 2021/0366315 | A1* | 11/2021 | Wang | G06V 10/774 |
| 2022/0101641 | A1* | 3/2022 | Hou | G06V 20/70 |
| 2023/0005448 | A1 | 1/2023 | Yamada | |
| 2023/0009238 | A1 | 1/2023 | Hulth | |
| 2023/0074046 | A1 | 3/2023 | Nilsson et al. | |
| 2024/0330854 | A1 | 10/2024 | Gadou et al. | |

FOREIGN PATENT DOCUMENTS

| | | | | |
|---|---|---|---|---|
| CN | 111914587 | A | | 11/2020 |
| CN | 112489240 | A * | 3/2021 | |
| CN | 214751970 | U | | 11/2021 |
| CN | 118690770 | A * | 9/2024 | ........... G06Q 10/087 |
| CN | 118710997 | A * | 9/2024 | |
| EP | 2980745 | A1 * | 2/2016 | ......... G06Q 30/0207 |
| JP | 2022125884 | A * | 8/2022 | |
| JP | 2022161949 | A * | 10/2022 | ............. B65G 1/137 |
| JP | 2023057118 | A | | 4/2023 |
| JP | 2023073432 | A | | 5/2023 |
| KR | 102451378 | B1 * | 10/2022 | |
| WO | 2018061790 | A1 | | 4/2018 |
| WO | 2019064925 | A1 | | 1/2019 |
| WO | 2019073063 | A1 | | 4/2019 |
| WO | 2019205761 | A1 | | 10/2019 |
| WO | 2023061599 | A1 | | 4/2023 |

OTHER PUBLICATIONS

European Patent Office, "Extended European Search Report", issued in connection with EP Patent Application No. 24187657.2 on Nov. 14, 2024, 8 pages.

Japanese Patent Office, "Notice of Refusal Reasons," issued in connection with Japanese Patent Application No. 2024-101683, mailed on Feb. 25, 2025, 8 pages. [English language machine translation included.].

Canadian Intellectual Property Office, "Examiner Requisition," issued in connection with Canadian Patent Application No. 3,248,202, mailed on Jun. 26, 2025, 7 pages.

IP Australia, "Exmaination report No. 1 for standard patent application," issued in connection with Australian Patent Application No. 202404738, mailed on Jul. 8, 2025, 6 pages.

* cited by examiner

COMMODITY IMAGE INFORMATION ACQUISITION SYSTEM, METHOD AND APPARATUS

CROSS-REFERENCE TO RELATED APPLICATIONS

This application claims priority to Chinese Patent Application No. 202311747373.0, filed on Dec. 18, 2023, which is hereby incorporated by reference in its entirety.

TECHNICAL FIELD

The disclosure relates to the technical field of mobile interconnection, and in particular to a commodity image information acquisition system, a method and an apparatus.

BACKGROUND

The description herein is not acknowledge as the prior art solely by virtue of its inclusion in this section.

With the continuous development of artificial intelligence technology, the industry of commercial superstores is also constantly transforming towards intelligentization and digitalization. The application of AI technology enables the commercial superstores to better meet customer needs, improve operational efficiency, enhance user experience, and further expand the market influence of the commercial superstores. Through the application of artificial intelligence algorithms, the commercial superstores can analyze and predict consumer demands in real time, and more accurately develop marketing strategies to meet the consumer demands, thereby improving sales and customer satisfaction. The commercial superstores can also use AI technology to automate inventory management, reduce inventory costs and shelf retention rate, and quickly replenish goods when necessary to ensure that the customers' shopping needs are met.

Digital shelf is a new type of intelligent retail tool with functions of intelligent analysis and automated management, and is capable of meeting a variety of needs such as the planogram analysis and commodity recognition in the commercial superstores and the like. The digital shelf generally includes hardware devices such as an electronic shelf label, an intelligent camera, an intelligent robot and the like, which, through real-time monitoring and data analysis of the commodity on the shelf, can improve the utilization rate of the shelf, optimize inventory management, and enhance the customers' shopping experience, thus improving the operating efficiency of the commercial superstores. The digital shelf has become an important constituent part for intelligent retail of the commercial superstores and also an important trend for the development of the commercial superstores in the future.

In the digital shelf, commodity image information acquisition is a key link. The acquired commodity image data can be used for subsequent commodity recognition, display analysis, out-of-stock verification and other businesses. In addition, the acquired commodity image is not enough for business, but needs to accurately bind the corresponding barcode, commodity information with the image.

However, for the commodity with similar specification requirements, data acquisition is often done manually. Special acquisition device is used to scan the commodity with a barcode scanning gun to obtain the barcode, and then several cameras are used to photograph, acquire and process the commodity. This method will involve the movement of the commodity, and the acquisition efficiency is very low. In addition, new products are very common in the commercial superstores, and the way of acquisition with a special device is very unrealistic.

SUMMARY

An embodiment of the disclosure provides a commodity image information acquisition system, which is used to improve the efficiency of acquisition of image and information of a commodity, especially a new commodity or a specific commodity, the system including:

an AIoT management server configured to transmit a product information list to a shelf label management server, and to transmit a notification of starting to take photos to an AI vision system;

a shelf label management server configured to determine the electronic shelf label to be notified according to the binding information between the electronic shelf label and the commodity and the received commodity information list, and to transmit an information display notification to the electronic shelf label to be notified; when the electronic shelf label to be notified performs an information display action according to the information display notification, to generate matching relationship between the information display action and the bar code of the commodity and transmit the matching relationship to the AI vision system;

the AI vision system configured to shoot the information display action and obtain the shot content after receiving the notification of starting to take photos; and based on the shot content and the received matching relationship, to perform parse and obtain a recognition result including spatial information of the electronic shelf label and spatial information and recognition information of the commodity, and to transmit the captured image and the recognition result to a commodity information management system;

the commodity information management system configured to associate the electronic shelf label with the commodity based on the captured image and the recognition result.

An embodiment of the disclosure provides a commodity image information acquisition method, which is applied to an AI vision system, and is used to improve the efficiency of acquisition of image and information of a commodity, especially a new commodity or a specific commodity, the method including:

shooting an information display action and obtaining the shot content after receiving a notification of starting to take photos transmitted by an AIoT management server;

performing parse and obtaining a recognition result including spatial information of an electronic shelf label and spatial information and recognition information of a commodity based on the shot content and a matching relationship transmitted by a shelf label management server, the matching relationship being a relationship between an information display action and a bar code of the commodity; wherein the matching relationship is generated by the shelf label management server while the electronic shelf label to be notified performs the information display action according to an information display notification; the information display notification is transmitted by the shelf label management server to the electronic shelf label to be notified after the electronic shelf label to be notified is determined according to the binding information between the electronic shelf label and the commodity, and the received commodity information list transmitted by the AIoT management server;

transmitting the captured image and the recognition result to a commodity information management system, wherein the captured image and the recognition result are used to associate the electronic shelf label with the commodity through the commodity information management system.

An embodiment of the disclosure provides a commodity image information acquisition apparatus, which is applied to an AI vision system, and is used to improve the efficiency of acquisition of image and information of a commodity, especially a new commodity or a specific commodity, the apparatus including:

a shooting module for shooting an information display action and obtaining the shot content after receiving a notification of starting to take photos transmitted by an AIoT management server;

a recognition module for performing parse and obtaining a recognition result including spatial information of an electronic shelf label and spatial information and recognition information of a commodity based on the shot content and a matching relationship transmitted by a shelf label management server, the matching relationship being a relationship between an information display action and a bar code of the commodity; wherein the matching relationship is generated by the shelf label management server while the electronic shelf label to be notified performs the information display action according to an information display notification; the information display notification is transmitted by the shelf label management server to the electronic shelf label to be notified after the electronic shelf label to be notified is determined according to the binding information between the electronic shelf label and the commodity, and the received commodity information list transmitted by the AIoT management server;

an association module for transmitting the captured image and the recognition result to a commodity information management system, wherein the captured image and the recognition result are used to associate the electronic shelf label with the commodity through the commodity information management system.

In the embodiment of the disclosure, the AIoT management server is used to transmit a product information list to a shelf label management server, and to transmit a notification of starting to take photos to an AI vision system; the shelf label management server is used to determine the electronic shelf label to be notified according to the binding information between the electronic shelf label and the commodity and the received commodity information list, and to transmit an information display notification to the electronic shelf label to be notified; when the electronic shelf label to be notified performs an information display action according to the information display notification, to generate matching relationship between the information display action and the bar code of the commodity and transmit the matching relationship to the AI vision system; the AI vision system is used to shoot the information display action and obtain the shot content after receiving the notification of starting to take photos; and based on the shot content and the received matching relationship, to perform parse and obtain a recognition result including spatial information of the electronic shelf label and spatial information and recognition information of the commodity, and to transmit the captured image and the recognition result to a commodity information management system; the commodity information management system is used to associate the electronic shelf label with the commodity based on the captured image and the recognition result. Compared to the way of manual acquisition in the prior art, this scheme uses AIoT technology to build the whole system, perform automatic discovery, automatic control, automatic recognition and automatic analysis, improve the efficiency of acquisition of the commodity image and information, and can efficiently carry out multiple rounds of acquisition, reduce the cost of repeated manual acquisition, and realize the data closed loop on the business of the digital shelf.

BRIEF DESCRIPTION OF THE DRAWINGS

In order to more clearly explain the embodiments of the disclosure or the technical solution in the prior art, drawings that need to be used in the description in embodiments or the prior art will be simply introduced below, obviously the drawings in the following description are merely some examples of the disclosure, for persons ordinarily skilled in the art, it is also possible to obtain other drawings according to these drawings without making creative efforts. In the drawings.

DESCRIPTION OF THE EMBODIMENTS

In order to more clearly explain purpose, technical solution and advantages according to embodiments of the disclosure, hereinafter the embodiments of the disclosure will be further described in detail in combination with the drawings. Here in the text, the schematic embodiments of the disclosure and the description thereof are used for explaining the disclosure and do not constitute definition to the disclosure.

The principle of the embodiment of the disclosure is that the digital-related equipment deployed in the commercial superstores is used based on the AIoT technology to automatically take photos, perform recognition and reasoning, calculation and analysis, and storage, thus achieving the purpose of automatic discovery, automatic control, automatic recognition, automatic analysis and automatic storage and entry, and improving the efficiency of acquisition of the commodity image and information; and multiple rounds of acquisition can be efficiently carried out, thus reducing the cost of repeated manual acquisition; and realizing the data closed loop on the business of the digital shelf.

The electronic shelf label in the embodiment of the disclosure refers to an electronic type commodity shelf label commonly found in the existing supermarket, which can carry out page switching and has an LED lamp to flash and light.

Figure 1:
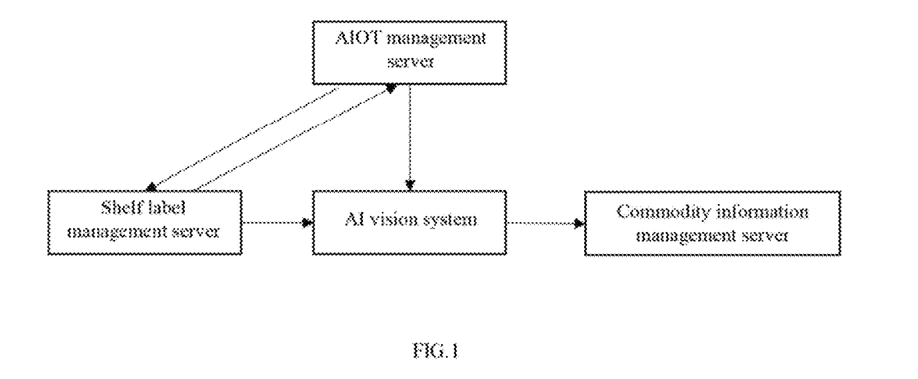
FIG. 1 is a schematic diagram of a commodity image information acquisition system in an embodiment of the present disclosure.

FIG. 1 is a schematic diagram of a commodity image information acquisition system in an embodiment of the present disclosure, including:

an AIoT management server configured to transmit a commodity information list to a shelf label management server, and to transmit a notification of starting to take photos to an AI vision system;

a shelf label management server configured to determine an electronic shelf label to be notified based on the binding information between the electronic shelf label and a commodity, and the received commodity information list, and to transmit an information display notification to the electronic shelf label to be notified; when the electronic shelf label to be notified performs an information display action based on the information display notification, to generate matching relationship between the information display action and the barcode of the commodity and transmit the matching relationship to the AI vision system;

an AI vision system configured to shoot the information display action and obtain a shot content after receiving the notification of starting to take photos; and based on the shot content and the received matching relationship, to perform parse and obtain a recognition result including spatial information of the electronic shelf label and spatial information and recognition information of the commodity, and to transmit the shot content and the recognition result to a commodity information management system;

a commodity information management system configured to determine associated commodities for the electronic shelf label based on the shot content and the recognition result, and assign electronic shelf label-bound commodity information to each of the associated commodities.

Figure 2:
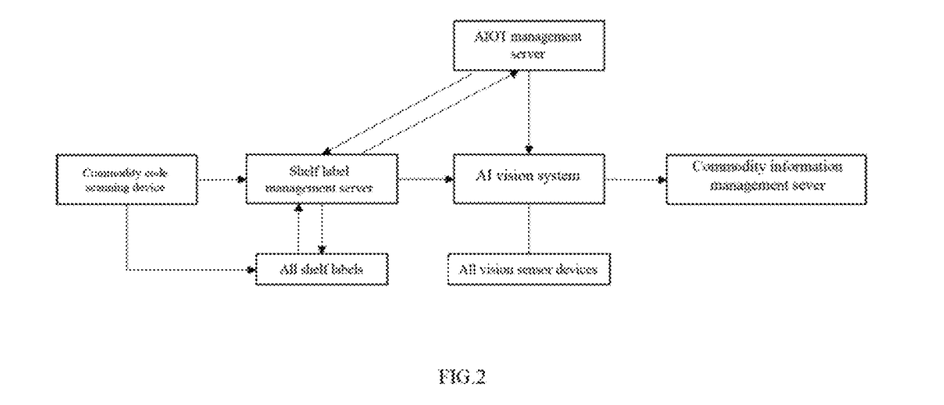
FIG. 2 is another schematic diagram of a commodity image information acquisition system in an embodiment of the present disclosure.

Referring to FIG. 2, the system further includes a code-scanning device configured to:

transmit a binding information of the electronic shelf label and the commodity on the shelf to the shelf label management server;

the shelf label management server is further configured to record the binding information of the electronic shelf label and the commodity, and to synchronize the binding information to the AIT management server.

In daily life, the clerk of the commercial superstore may carry out the following actions: using the code-scanning device to bind the electronic shelf label on the shelf with the commodity.

In an embodiment, the AIoT management server is further configured to:

perform statistics of new commodity, to obtain new commodity information from the shelf label management server or import the new commodity information, and add the new commodity information to the commodity information list;

or receive a preset commodity information list.

Hereinbefore two scenarios are described where the commodity information list is obtained, and in the two scenarios, the AI vision system can be notified to take photos in several rounds, so as to obtain more commodity images in subsequent steps. The information of the new commodity can come from the shelflabel management server, or can be imported externally to the AIoT management server, and of course, there can be other ways, not limited here.

In an embodiment, the information display action is page switching or flashing light;
  when the information display action is page switching, the shot content is a page switching content image;
  when the information display action is flashing light, the shot content is a flashing light image sequence.

In the specific implementation, the AI vision system can control a vision sensor device to take photos, and can perform AI recognition reasoning calculation on visual images. The vision sensor device includes, but is not limited to, a fixedly mounted camera, a movable camera, a rotatable camera, a movable robot with a camera, an aircraft with a camera, etc., and the above vision sensor device look down upon, or look up at, or face directly at the commodity shelf in the commercial superstores, in order to obtain the shot content of the shelf. When the information display action is page switching, a specific switching page number is displayed so as to be recognized by the camera; when the information display action is flashing light, the flashing light process should be shoot, and the shot content obtained is the flashing light image sequence.

In an embodiment, the spatial information is a location boundary frame;
  the AI vision system is specifically configured to:
  discard the shot content without information display action;
  detect the electronic shelf label in the remaining shot content, to obtain the location boundary frame of each electronic shelf label;
  recognize the information display action for each detected electronic shelf label;
  parse the information display action and obtain the recognition information based on the matching relationship between the information display action and the barcode of the commodity, in which the recognition information is the barcode of the corresponding commodity of each electronic shelf label;
  detect the commodity in the shot content, to obtain the location boundary frame of each commodity.

Through the above AI calculation, the location boundary frame of the electronic shelf label and the location boundary frame of the commodity are obtained, and the barcode of the corresponding commodity of each electronic shelf label is obtained, and such information is configured to subsequent association. Methods for detecting the electronic shelf label and the commodity include, but are not limited to, traditional visual processing algorithms, deep learning methods, etc. When the deep learning methods are used, the methods include but are not limited to a target detection algorithm trained in advance by a machine learning method, an image segmentation algorithm, etc. The methods of recognizing the information display action (i.e., the page switching content or flashing light of the electronic shelf label) also include but are not limited to a traditional visual processing algorithm and a deep learning method.

In an embodiment, the AI vision system performs the steps of recognizing the information display action, including:
  for each detected electronic shelf label, cropping the remain shot content according to the location boundary frame of the electronic shelf label, to obtain cropped image of the shelf label;
  performing recognition of each cropped image of the shelf label to recognize the information display action.

Through the above steps of cropping the cropped image of the shelf label, the recognition of the information display action can be accelerated.

In an embodiment, the commodity information management system is specifically configured to:

determine the commodity closest to each electronic shelf label as an anchor commodity corresponding to the electronic shelf label based on the spatial information of the electronic shelf label and the spatial information of the commodity;

calculate similarity between the shot content of each other commodity around each anchor commodity within a preset range and the shot content of the anchor commodity; determine that the other commodity and the anchor commodity are the same commodity category of commodity if the corresponding similarity of each other commodity is not lower than a preset threshold value;

associate and bind each electronic shelf label and the corresponding anchor commodity and other commodities of the same commodity category as the anchor commodity.

In specific implementation, each other commodity around the above described anchor commodity within the preset range refers to n commodities stacked on left side or right side or upper side of the anchor commodity. Each electronic shelf label and the corresponding anchor commodity and other commodities of the same commodity category as the anchor commodity are associated and bound, including binding the commodity and information so that each commodity associated together is given clear barcode information, commodity name information, etc.

Figure 3:
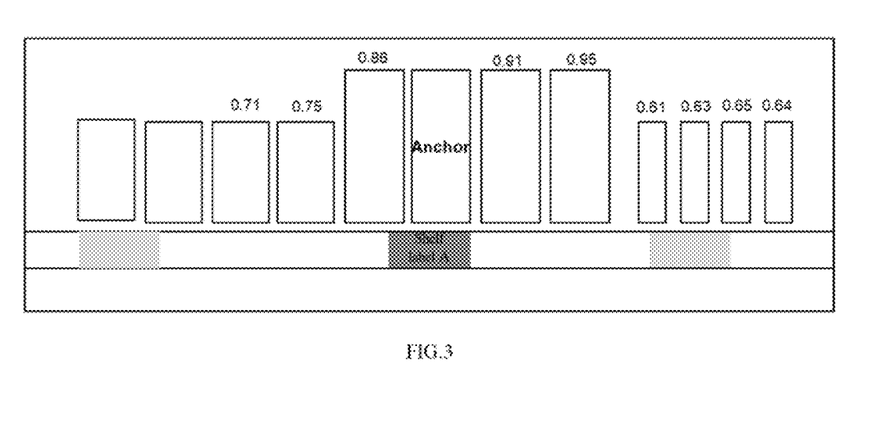
FIG. 3 is a principle diagram of calculation of similarity between the anchor commodity and other commodities in an embodiment of the disclosure.

FIG. 3 is a principle diagram of calculation of similarity between the anchor commodity and other commodities in an embodiment of the disclosure. For the electronic shelf label A, an anchor commodity can be determined based on the nearest distance relationship, and the similarity between the surrounding other commodities and the anchor commodity is calculated. The number displayed on the head of each other commodity represents the image similarity s to the image of the anchor commodity. Assuming that the threshold is set as 0.85, then three other commodities whose similarity values are 0.86, 0.91 and 0.95 are regarded as the same commodity as the anchor commodity, forming an association relationship, and can be information bound with the electronic shelf label A.

In an embodiment, the commodity information management system is further configured to:

crop a commodity image from the shot content, and store the commodity image and the corresponding commodity information in a database based on the spatial information of the commodity.

In an embodiment, the commodity information management system is further configured to:

perform visualization display of objects in the association and binding process, the objects including the shot content, the recognition result, the anchor commodity corresponding to the electronic shelf label, each other commodity within the preset range, and the associated and bound commodity;

receives manual edition to the objects, including addition, deletion, or modification.

The above process can be carried out in the display interface of the commodity information management system, that is, the user can intuitively see the process of association and binding, and can also intervene in the process of association and binding to achieve adjustment.

An embodiment of the disclosure further provides a commodity image information acquisition method, which is applied to an AI vision system, and adopts similar principle to that of the commodity image information acquisition system, and is not repeated here.

Figure 4:
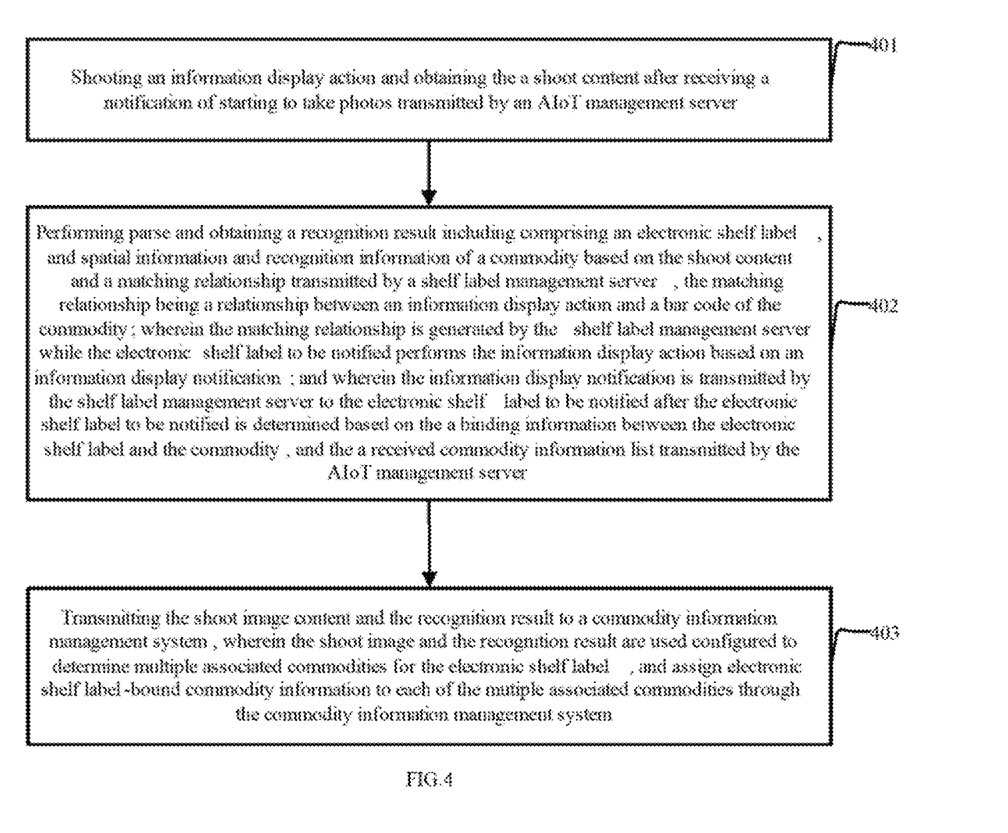
FIG. 4 is a flow chart of a commodity image information acquisition method in an embodiment of the present disclosure.

FIG. 4 is a flow chart of a commodity image information acquisition method in an embodiment of the present disclosure, including:

a step 401 of shooting an information display action and obtaining a shot content after receiving a notification of starting to take photos transmitted by an AIoT management server;

a step 402 of performing parse and obtaining a recognition result including spatial information of an electronic shelf label and spatial information and recognition information of a commodity based on the shot content and a matching relationship transmitted by a shelf label management server, the matching relationship being a relationship between an information display action and a barcode of the commodity; in which the matching relationship is generated by the shelf label management server while the electronic shelf label to be notified performs the information display action based on an information display notification; and in which the information display notification is transmitted by the shelf label management server to the electronic shelf label to be notified after the electronic shelf label to be notified is determined based on the binding information between the electronic shelf label and the commodity, and the received commodity information list transmitted by the AIoT management server;

a step 403 of transmitting the shot content and the recognition result to a commodity information management system, in which the captured image and the recognition result are configured to determine associated commodities for the electronic shelf label, and assign electronic shelf label-bound commodity information to each of the associated commodities.

In an embodiment, performing parse and obtaining a recognition result based on the shot content and a matching relationship transmitted by a shelf label management server, includes:

discarding the shot content without information display action;

detecting the electronic shelf label in the remaining shot content, to obtain the location boundary frame of each electronic shelf label;

recognizing the information display action for each detected electronic shelf label;

parsing the information display action and obtain the recognition information based on the matching relationship between the information display action and the barcode of the commodity, in which the recognition information is the barcode of the corresponding commodity of each electronic shelf label;

detecting the commodity in the shot content, to obtain the location boundary frame of each commodity.

In an embodiment, recognizing the information display action, includes:

for each detected electronic shelf label, cropping the remain shot content according to the location boundary frame of the electronic shelf label, to obtain cropped image of the shelf label;

performing recognition of each cropped image of the shelf label, to recognize the information display action.

An embodiment of the disclosure further provides a commodity image information acquisition apparatus, which is applied to an AI vision system, and adopts similar principle to that of the commodity image information acquisition system, and is not repeated here.

Figure 5:
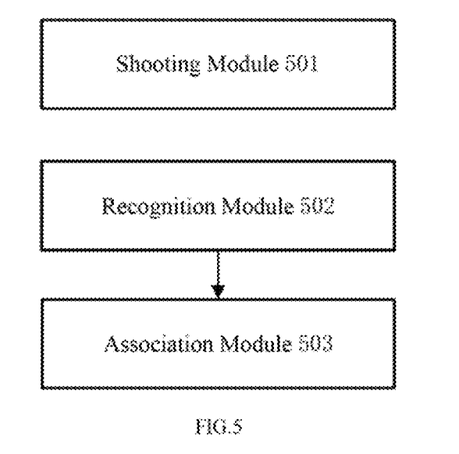
FIG. 5 is a schematic diagram of a commodity image information acquisition apparatus in an embodiment of the present disclosure.

FIG. 5 is a schematic diagram of a commodity image information acquisition apparatus in an embodiment of the present disclosure, including:

a shooting module 501 for shooting an information display action and obtaining a shot content after receiving a notification of starting to take photos transmitted by an AIoT management server;

a recognition module 502 for performing parse and obtaining a recognition result including spatial information of_an electronic shelf label and spatial information and recognition information of a commodity based on the shot content and a matching relationship transmitted by a shelf label management server, in which the matching relationship being a relationship between an information display action and a barcode of the commodity; wherein the matching relationship is generated by the shelf label management server while the electronic shelf label to be notified performs the information display action based on an information display notification; and in which the information display notification is transmitted by the shelf label management server to the electronic shelf label to be notified after the electronic shelf label to be notified is determined based on a binding information between the electronic shelf label and the commodity, and a received commodity information list transmitted by the AIoT management server;

an association module 503 for transmitting the shot content and the recognition result to a commodity information management system, in which the captured image and the recognition result are configured to determine multiple associated commodities for the electronic shelf label, and assign electronic shelf label-bound commodity information to each of the associated commodities through the commodity information management system.

In an embodiment, the recognition module 502 is specifically configured to:

discard the shot content without information display action;

detect the electronic shelf label in the remaining shot content, to obtain the location boundary frame of each electronic shelf label;

recognize the information display action for each detected electronic shelf label;

parse the information display action and obtain the recognition information based on the matching relationship between the information display action and the barcode of the commodity, in which the recognition information is the barcode of the corresponding commodity of each electronic shelf label;

detect the commodity in the shot content, to obtain the location boundary frame of each commodity.

In an embodiment, the recognition module 502 is specifically configured to:

for each detected electronic shelf label, crop the remain shot content according to the location boundary frame of the electronic shelflabel, to obtain cropped image of the shelf label;

perform recognition of each cropped image of the shelf label to recognize the information display action.

In summary, the system, method and apparatus of the embodiment of the disclosure have the following beneficial effects:

First, the commodity information management system can automatically calculate, acquire and store the commodity image and the bound commodity information based on the information on the image.

Second, the architecture of the AIoT management system can be simultaneously connected to the shelf label management server and the AI vision system, and the shelf label management server can connect all electronic shelf labels in the scenario, and the AI vision system can connect all the visual cameras or devices in the scenario, so as to realize the interconnection of multiple devices.

Third, the AIoT management system can discover new commodity based on the database information, and transmit a new commodity list or the set commodity list to the shelf label management server, so as to control the electronic shelf label to perform page switching or flashing light. The image information of newly added and manually focused commodity in the commercial superstore scenario can be obtained quickly, thereby improving business efficiency.

Fourth, the AI vision system can synchronize the actions under the notification of the AIoT management server, obtain the corresponding image set when the shelf label performs page switching or flashing light, and can perform reasoning calculation. There is no need for manual and iterative acquisition, avoiding low efficiency and high cost.

Fifth, the AI vision system can detect the electronic shelf label and commodity on the shelf image, and can recognize the page switching content of the electronic shelf label or the light color of flashing light.

Figure 6:
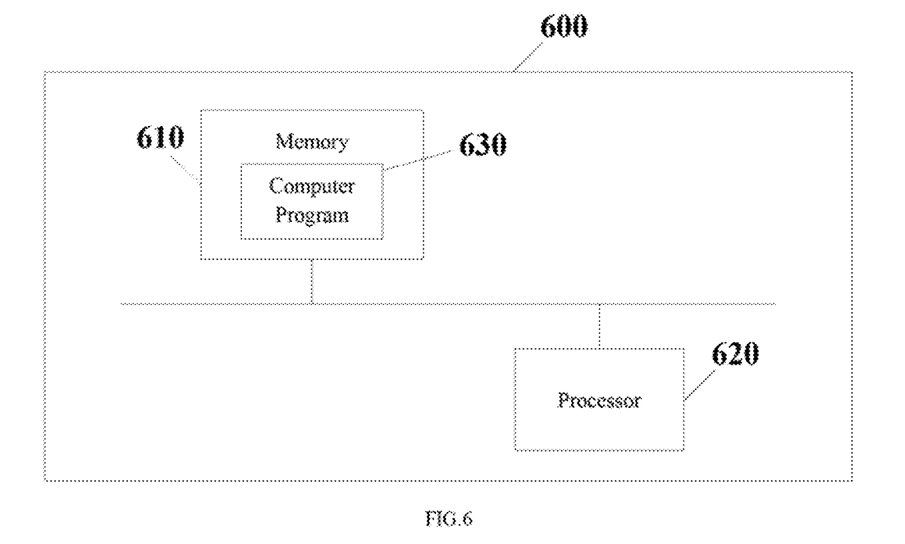
FIG. 6 is a schematic diagram of a computer device in an embodiment of the disclosure.

The embodiment of the present disclosure further provides a computer device. FIG. 6 is a schematic diagram of a computer device in an embodiment of the disclosure. The computer device 600 includes a memory 610, a processor 620 and a computer program 630 stored on the memory 610 and running on the processor 620, and the processor 620 implements the commodity image information acquisition method described above when executing the computer program 630.

The embodiment of the present disclosure further provides a computer-readable storage medium which stores a computer program which, when being executed by a processor, implements the commodity image information acquisition method described above.

The embodiment of the present disclosure further provides a computer program product which includes a computer program which, when being executed by a processor, implements the commodity image information acquisition method described above.

Those skilled in the art shall understand that, the embodiments of the present disclosure can be provided as a method, a system or a computer program product. Therefore, the present disclosure can adopt the forms of a full hardware example, a full software example, or combination of a software example and a hardware example. Moreover, the present disclosure can adopt the form of a computer program product that is implemented on one or more computer-usable storage medium (including but not limited to a disk memory, a CD-ROM, an optical memory, and etc.) including computer-usable program codes.

The disclosure is described with reference to flow diagrams and/or block diagrams of the method, the device (system) and the computer program product according to the embodiment of the disclosure. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program instructions can also be stored in a computer-readable memory that can guide a computer or other programmable data processing device to operate in a special way, so that the instruction stored in the computer-readable memory generates a manufactured product including a instruction device which achieves functions designated in one or more flows in the flow diagrams and/or one or more blocks in the block diagrams.

These computer program instructions can also be loaded on a computer or other programmable data processing device, on which a series of operation steps are executed to generate processing achieved by the computer, so that the instruction executed on the computer or other programmable data processing device is provided for being used in the steps of achieving functions designated in one or more flows in the flow diagrams and/or one or more blocks in the block diagrams.

The purpose, technical solution and beneficial effect of the disclosure have been further described in detail in the above specific embodiments, it should be understood that the above contents are merely specific embodiments of the disclosure and are not for limiting protection scope of the disclosure, and any modifications, equivalent replacements, improvements and the like within the spirit and principle of the present disclosure shall be included within the protection scope of the present disclosure.

What is claimed is:

1. A commodity image information acquisition system, comprising:
   an AIoT management server configured to transmit a commodity information list to a shelf label management server, and to transmit a notification of starting to take photos to an AI vision system;
   a shelf label management server configured to determine an electronic shelf label to be notified based on a binding information between the electronic shelf label and a commodity, and the received commodity information list, and to transmit an information display notification to the electronic shelf label to be notified; when the electronic shelf label to be notified performs an information display action based on the information display notification, to generate matching relationship between the information display action and the barcode of the commodity and transmit the matching relationship to the AI vision system;
   the AI vision system comprising a vision sensor device, a first processor and at least one first memory which comprises computer program instructions for execution by the first processor, wherein the vision sensor device is configured to shoot the information display action and obtain a shot content after receiving the notification of starting to take photos; and the instructions in the at least one first memory are configured to perform parse and obtain a recognition result comprising spatial information of the electronic shelf label and spatial information and recognition information of the commodity based on the shot content and the received matching relationship, and to transmit the shot content and the recognition result to a commodity information management system; and
   the commodity information management system comprising a second processor and at least one second memory which comprises computer program instructions for execution by the second processor, wherein the instructions in the at least one second memory are configured to determine associated commodities for the electronic shelf label based on the shot content and the recognition result, and assign electronic shelf label-bound commodity information to each of the associated commodities; and wherein
   the spatial information is a location boundary frame; and
   the instructions in the at least one first memory of the AI vision system are specifically configured to:
      discard the shot content without information display action;
      detect the electronic shelf label in the remaining shot content, to obtain the location boundary frame of each electronic shelf label:
      recognize the information display action for each detected electronic shelf label;
      parse the information display action and obtain the recognition information based on the matching relationship between the information display action and the barcode of the commodity, wherein the recognition information is the barcode of the corresponding commodity of each electronic shelf label; and
      detect the commodity in the shot content, to obtain the location boundary frame of each commodity.

2. The commodity image information acquisition system according to claim 1, further comprising a code-scanning device comprising a third processor and at least one third memory which comprises computer program instructions for execution by the third processor, wherein the instructions in the at least one third memory are configured to:
   transmit a binding information of the electronic shelf label and the commodity on the shelf to the shelf label management server;
   the shelf label management server is further configured to record the binding information of the electronic shelf label and the commodity, and to synchronize the binding information to the AIoT management server.

3. The commodity image information acquisition system according to claim 1, wherein the AIoT management server is further configured to:
   perform statistics of new commodity, to obtain new commodity information from the shelf label management server or import the new commodity information, and add the new commodity information to the commodity information list;
   or receive a preset commodity information list.

4. The commodity image information acquisition system according to claim 1, wherein the information display action is page switching or flashing light;
   when the information display action is page switching, the shot content is a page switching content image;
   when the information display action is flashing light, the shot content is a flashing light image sequence.

5. The commodity image information acquisition system according to claim 1, wherein the computer program instructions stored in the first memory of the AI vision system performs the steps of recognizing the information display action, comprising:

for each detected electronic shelf label, cropping the remain shot content according to the location boundary frame of the electronic shelf label, to obtain cropped image of the shelf label;

performing recognition of each cropped image of the shelf label, to recognize the information display action.

6. The commodity image information acquisition system based on claim 5, wherein the computer program instructions stored in the second memory of the commodity information management system is further configured to:

perform visualization display of objects in the association and binding process, the objects comprising the shot content, the recognition result, the anchor commodity corresponding to the electronic shelf label, each other commodity within the preset range, and the associated and bound commodity; and receive manual edition to the objects, comprising addition, deletion, or modification.

7. The commodity image information acquisition system according to claim 1, wherein the computer program instructions stored in the second memory of the commodity information management system is specifically configured to:

determine the commodity closest to each electronic shelf label as an anchor commodity corresponding to the electronic shelf label based on the spatial information of the electronic shelf label and the spatial information of the commodity;

calculate similarity between the shot content of each other commodity around each anchor commodity within a preset range and the shot content of the anchor commodity; determine that the other commodity and the anchor commodity are the same commodity category of commodity if the corresponding similarity of each other commodity is not lower than a preset threshold value;

determine the anchor commodity corresponding to the electronic shelf label and the other commodity in the same commodity category as the anchor commodity as associated commodities of the electronic shelf label.

8. The commodity image information acquisition system according to claim 1, wherein the computer program instructions stored in the second memory of the commodity information management system is further configured to:

crop a commodity image from the shot content, and store the commodity image and the corresponding commodity information in a database based on the spatial information of the commodity.

9. A commodity image information acquisition method, which is applied to an AI vision system, wherein-comprising the method comprises:

shooting an information display action and obtaining a shot content after receiving a notification of starting to take photos transmitted by an AIoT management server;

performing parse and obtaining a recognition result comprising spatial information of an electronic shelf label, and spatial information and recognition information of a commodity based on the shot content and a matching relationship transmitted by a shelf label management server, the matching relationship being a relationship between an information display action and a barcode of the commodity, specifically comprising discarding the shot content without information display action; detecting the electronic shelf label in the remaining shot content, to obtain the location boundary frame of each electronic shelf label; recognizing the information display action for each detected electronic shelf label;

parsing the information display action and obtain the recognition information based on the matching relationship between the information display action and the barcode of the commodity, wherein the recognition information is the barcode of the corresponding commodity of each electronic shelf label; detecting the commodity in the shot content, to obtain the location boundary frame of each commodity, wherein the spatial information is a location boundary frame; wherein the matching relationship is generated by the shelf label management server while the electronic shelf label to be notified performs the information display action based on an information display notification; and wherein the information display notification is transmitted by the shelf label management server to the electronic shelf label to be notified after the electronic shelf label to be notified is determined based on a binding information between the electronic shelf label and the commodity, and a received commodity information list transmitted by the AIoT management server; and transmitting the shot content and the recognition result to a commodity information management system, wherein the captured image and the recognition result are configured to determine associated commodities for the electronic shelf label, and assign electronic shelf label-bound commodity information to each of the associated commodities through the commodity information management system.

10. A commodity image information acquisition apparatus, which is applied to an AI vision system, wherein the apparatus comprises:

a vision sensor device configured to shoot information display action and obtain a shot content after receiving a notification of starting to take photos transmitted by an AIoT management server;

a processor; and at least one memory comprising computer program instructions for execution by the processor, wherein the instructions are configured to:

perform and obtain a recognition result comprising a spatial information of an electronic shelf label, and spatial information and recognition information of a commodity based on the shot content and a matching relationship transmitted by a shelf label management server, wherein the matching relationship being a relationship between an information display action and a barcode of the commodity; wherein the matching relationship is generated by the shelf label management server while the electronic shelf label to be notified performs the information display action based on an information display notification; and wherein the information display notification is transmitted by the shelf label management server to the electronic shelf label to be notified after the electronic shelf label to be notified is determined based on a binding information between the electronic shelf label and the commodity, and a received commodity information list transmitted by the AIoT management server; the instructions are further configured to: discard the shot content without information display action; detect the electronic shelf label in the remaining shot content, to obtain the location boundary frame of each electronic shelf label; recognize the information display action for each detected electronic shelf label; parse the information display action and obtain the recognition information based on the matching relationship between the information display action and the barcode of the commodity, wherein the recognition information is the barcode of the corresponding commodity of each electronic shelf label; detect the commodity in the shot content, to obtain the location boundary frame of each commodity, wherein the spatial information is a location boundary frame; and transmit the shot content and the recognition result to a commodity information management system, wherein the captured image and the recognition result are configured to determine associated commodities for the electronic shelf label, and assign electronic shelf label-bound commodity information to each of the associated commodities through the commodity information management system.

* * * * *